(12) United States Patent
Yamaya

(10) Patent No.: US 12,366,487 B2
(45) Date of Patent: Jul. 22, 2025

(54) TEMPERATURE ESTIMATION APPARATUS, TEMPERATURE ESTIMATION METHOD AND STORAGE MEDIUM

(71) Applicant: CASIO COMPUTER CO., LTD., Tokyo (JP)

(72) Inventor: Takashi Yamaya, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 431 days.

(21) Appl. No.: 17/942,286

(22) Filed: Sep. 12, 2022

(65) Prior Publication Data
US 2023/0085210 A1 Mar. 16, 2023

(30) Foreign Application Priority Data
Sep. 13, 2021 (JP) ................................ 2021-148315

(51) Int. Cl.
*G01K 7/42* (2006.01)
*G01K 13/20* (2021.01)

(52) U.S. Cl.
CPC .............. *G01K 7/427* (2013.01); *G01K 13/20* (2021.01)

(58) Field of Classification Search
CPC ................................ G01K 7/427; G01K 13/20
USPC ......................................................... 374/110
See application file for complete search history.

(56) References Cited

U.S. PATENT DOCUMENTS

| | | | |
|---|---|---|---|
| 5,445,158 A * | 8/1995 | Pompei | G01J 5/048 374/E1.013 |
| 2002/0191675 A1 | 12/2002 | Tokita et al. | |
| 2005/0043631 A1* | 2/2005 | Fraden | G01K 13/20 374/E7.042 |

(Continued)

FOREIGN PATENT DOCUMENTS

| | | | |
|---|---|---|---|
| JP | 2009222543 A | 10/2009 | |
| JP | 2016109518 A | 6/2016 | |

(Continued)

OTHER PUBLICATIONS

Notice of Reasons for Refusal dated Sep. 5, 2023 received in Japanese Patent Application No. JP 2021-148315.

(Continued)

*Primary Examiner* — Mirellys Jagan
(74) *Attorney, Agent, or Firm* — Scully, Scott, Murphy & Presser, P.C.

(57) ABSTRACT

A temperature estimation apparatus includes: a first temperature sensor that measures first temperature of first part of a target that has a heat source; a second temperature sensor that measures second temperature of second part that is farther from the heat source than the first part; and a processor. The processor obtains temperature-for-estimation data regarding the first and second temperatures that are measured in a state where a predetermined condition is satisfied, the predetermined condition corresponding to a certain state of change in the temperature of the heat source. Based on the obtained temperature-for-estimation data, the processor obtains a single thermal resistance parameter in a thermal model. Based on the obtained thermal resistance parameter and the measured first and second temperatures, the processor estimates the temperature of the heat source as a deep-body temperature of the target.

13 Claims, 6 Drawing Sheets

(56) References Cited

U.S. PATENT DOCUMENTS

2007/0055171 A1    3/2007  Fraden

FOREIGN PATENT DOCUMENTS

| JP | 2019097819 A | 6/2019 | | |
|---|---|---|---|---|
| WO | WO-2019133449 A1 | * | 7/2019 | ............... A61B 5/01 |
| WO | WO-2020213437 A1 | * | 10/2020 | ............... G01K 1/16 |

OTHER PUBLICATIONS

Extended European Search Report dated Jan. 30, 2023 received in European Patent Application No. EP 22193675.0.
First Office Action dated Jul. 29, 2024 received in Chinese Patent Application No. 202211081338.5.

* cited by examiner

TEMPERATURE ESTIMATION APPARATUS, TEMPERATURE ESTIMATION METHOD AND STORAGE MEDIUM

CROSS-REFERENCE TO RELATED APPLICATIONS

This application is based upon and claims the benefit of priority from the prior Japanese Patent Application No. 2021-148315, filed on Sep. 13, 2021, the entire contents of which are incorporated herein by reference.

BACKGROUND OF THE INVENTION

Technical Field

The present disclosure relates to a temperature estimation apparatus, temperature estimation method and a storage medium.

A known temperature estimation apparatus estimates temperature of a part (estimation target part) that cannot be directly measured. A known temperature estimation apparatus measures temperature and heat flow at parts where temperatures are measurable. On the basis of the measurement result, the temperature estimation apparatus calculates the temperature of the estimation target part by using a thermal model of heat flow between the estimation target part and the part where temperatures are measurable.

A known thermal model determines the heat flow on the basis of temperature difference and thermal resistance between two points without taking capacitance components into account. JP2019-97819A discloses a technology to calculate/estimate the temperature of the estimation target part. According to the technology, temperatures of two points between which the thermal resistance is known are measured twice on assumption that the temperature of the estimation target part does not change; and the thermal resistance between the estimation target part and one of the two points is estimated. Accordingly, the temperature of the estimation target part can be calculated/estimated.

SUMMARY OF THE INVENTION

There is provided a temperature estimation apparatus including: a first temperature sensor configured to measure a first temperature of a first part of a target that has a heat source; a second temperature sensor configured to measure a second temperature of a second part, the second part being farther from the heat source than the first part; and
a processor, wherein
 the processor obtains temperature-for-estimation data regarding the first temperature and the second temperature that are measured by the first temperature sensor and the second temperature sensor, respectively in a state where a predetermined certain condition is satisfied, the certain condition corresponding to a certain state of change in a temperature of the heat source,
 based on the obtained temperature-for-estimation data, the processor obtains a thermal resistance parameter that represents a relation between a first thermal resistance and a second thermal resistance in a thermal model, wherein
  the thermal model includes the heat source, the first part, and the second part,
  in the thermal model, the first thermal resistance represents a relation of temperatures and heat flow between the heat source and the first part, and the second thermal resistance represents a relation of temperatures and heat flow between the first part and the second part,
 based on the obtained thermal resistance parameter, the measured first temperature and the second temperature, the processor estimates the temperature of the heat source as a deep-body temperature of the target.

BRIEF DESCRIPTION OF THE SEVERAL VIEWS OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION OF THE INVENTION

Hereinafter, an embodiment of the present invention is described with reference to the drawings.

Figure 1A:
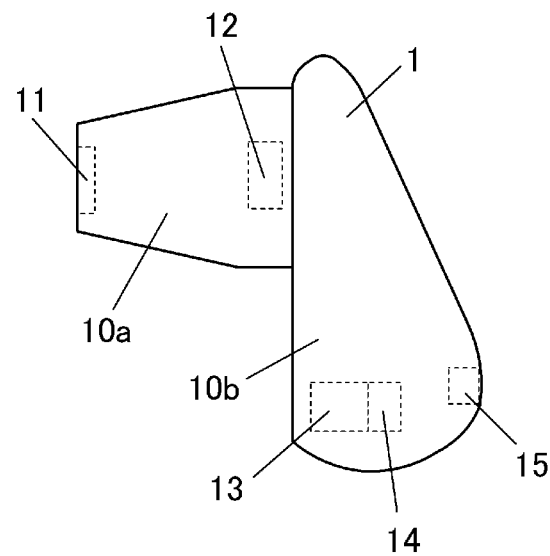
FIG. 1A shows a temperature estimation apparatus according to an embodiment.
Figure 1B:
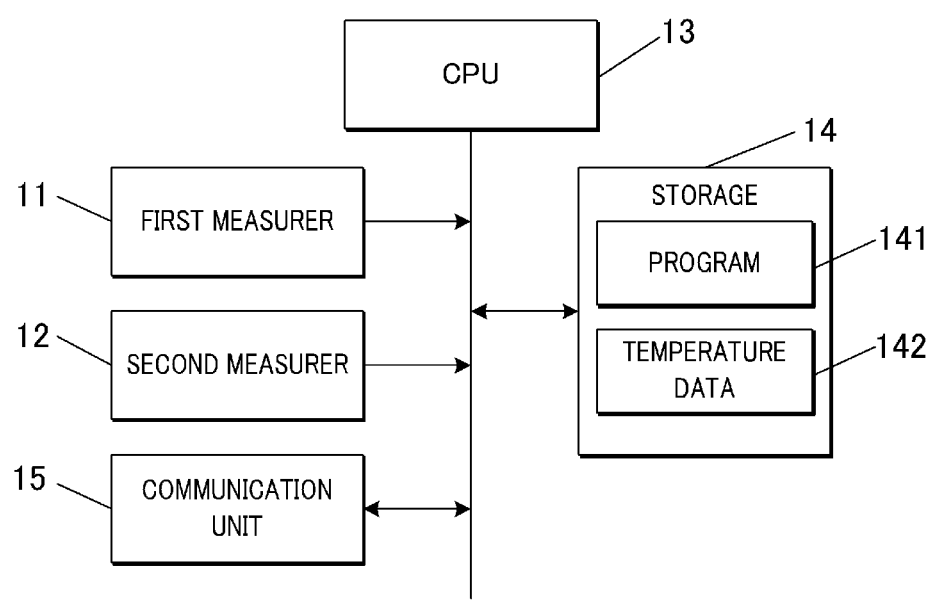
FIG. 1B is a block diagram of the temperature estimation apparatus in the embodiment.

FIGS. 1A, 1B are figures to explain a temperature estimation apparatus 1 in this embodiment.

The temperature estimation apparatus 1 is configured to estimate the temperature of a deep part (deep-body temperature) in a living body (a target that has a heat source, herein a human body) on the basis of the result of measuring temperatures of parts where temperatures are measurable. For example, the temperature estimation apparatus 1 is inserted into an ear hole of the living body to measure temperatures at two parts: inside the ear and near the ear opening. In general, the deep-body temperature refers to the temperature of a body part that generates heat (heat source), such as the internal organs and the brain.

As shown in FIG. 1A, the temperature estimation apparatus 1 has an insertion section 10a, which is inserted into the ear hole, and a main body 10b. The insertion section 10a is provided with a first measurer 11 (first temperature sensor) and a second measurer 12 (second temperature sensor). The main body 10b is provided with a central processing unit (CPU) 13 (processor), a storage 14, and a communication unit 15.

The first measurer 11 measures a temperature (first temperature) of the interior of the ear (first part that is closer to the heat source) and outputs the measurement result to the CPU 13. The first measurer 11 is an infrared temperature sensor, for example. When the temperature estimation apparatus 1 is inserted into the ear, the first measurer 11, which is disposed at around the inserted end of the apparatus 1, measures the temperature of the eardrum.

The second measurer 12 measures the temperature (second temperature) at around the ear opening (second part that is farther from the heat source than the first part) and outputs the measurement result to the CPU 13. The second measurer 12 is a contact type temperature sensor that uses a thermistor, for example.

The CPU 13 is a hardware processor that executes arithmetic processing to centrally control the operation of the temperature estimation apparatus 1. The CPU 13 may include a dedicated microcomputer unit or an IC chip, for example.

The storage 14 includes a random access memory (RAM) and a nonvolatile memory. The RAM provides the CPU 13 with a working memory space and stores temporary data. The nonvolatile memory stores control programs to be executed by the CPU 13 and setting data. The nonvolatile memory is a flash memory, for example.

As shown in the block diagram in FIG. 1B, the storage 14 stores a program(s) 141 and temperature data 142. The program 141 is stored in the nonvolatile memory and used for controlling the operation of the temperature estimation apparatus 1. The temperature data 142 includes data of the measurement result by the first measurer 11 and the second measurer 12; arithmetic parameters obtained/estimated on the basis of the measurement result; and deep-body temperatures at respective timings estimated/calculated on the basis of the measurement result and the arithmetic parameters. These data may be stored either on the RAM or the nonvolatile memory. For example, in a case where the temperature estimation apparatus 1 measures temperatures at all times and outputs the measurement result to an external device via the communication unit 15 at appropriate timings, the temperature data 142 may only be stored on the RAM. On the other hand, in a case where the operation is switched on/off according to the switching operation and the data that has not sent to an external device needs to be retained during the off state, the temperature data 142 may be stored on the nonvolatile memory.

The communication unit 15 wirelessly communicates with external devices. The wireless communication protocol may be ultra-wideband (UWB) that conforms to a body area network (BAN) or Bluetooth Low Energy (registered trademark), for example. The strength of radio waves is determined so as not to harm the human body. The data measured by the first measurer 11 and the second measurer 12 may be displayed on an external device in real time with an application, for example. In the case, the communication unit 15 may send the measurement result to the external device in real time under the control of the CPU 13.

The heat generated by the operation of the CPU 13, the storage 14, and the communication unit 15 should not affect temperatures measured by the first measurer 11 and the second measurer 12. For example, the temperature estimation apparatus 1 may have a heat-insulating layer between the part including the first and the second measurers 11, 12 and the part of the main body 10b including the CPU 13, the storage 14, and the communication unit 15. The heat-insulating layer may be sized, positioned and oriented so as not to obstruct radiation of heat from around the ear of the living body. The main body 10b may be made small (thin) because a large-sized main body 10b may decrease wearing comfort and disturb the wearer's sleep, in particular.

In addition to the above components, the temperature estimation apparatus 1 can house a battery that supplies power to the components for operation. The battery may be a dry-cell battery that is detachable and replaceable. The battery may also be a secondary battery that is repeatedly rechargeable.

The temperature estimation apparatus 1 may further include a not-illustrated switch and may measure temperatures only while the switch is on. The temperature estimation apparatus 1 may not include a switch and measure temperatures at all times. The temperature estimation apparatus 1 may further include a contact sensor for determining whether the apparatus 1 is inserted into the ear. On the basis of the determination, the temperature estimation apparatus 1 may stop/start measuring temperatures or change measurement intervals. The period of time during which temperatures are continually measured (time between the start and the end of measurement) or the time zone during which temperatures are measured (start time and end time) may be determined. On the basis of the determined period or the time zone, the temperature estimation apparatus 1 may automatically start/end the measurement. In the case, the temperature estimation apparatus 1 may keep the current date and time and determine the timing to start/end the measurement on the basis of the current date and time.

The temperature estimation apparatus 1 may also include a display. The display may display measured temperatures, the current date and time, the measurement period of time, the measurement time zone, and so forth.

Next, the method for estimating the deep-body temperature (temperature estimation method) in this embodiment is described.

In this embodiment, the CPU 13 of the temperature estimation apparatus 1 obtains the first temperature at the first part and the second temperature at the second part from the first measurer 11 and the second measurer 12 at appropriate time intervals. The CPU 13 accumulates data of these measured temperatures and then extracts data that meet certain conditions to be described below. The CPU 13 then obtains a parameter for estimating the deep-body temperature on the basis of the certain conditions. On the basis of the obtained parameter and temperatures at the first and second temperatures, the deep-body temperature can be calculated/estimated.

Figure 2A:
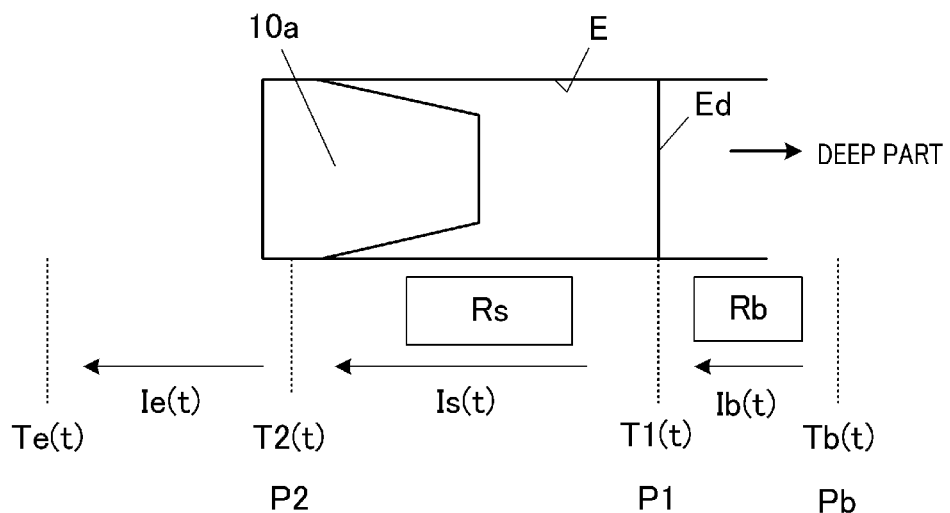
FIG. 2A is a figure to explain a method for estimating the deep-body temperature.
Figure 2B:
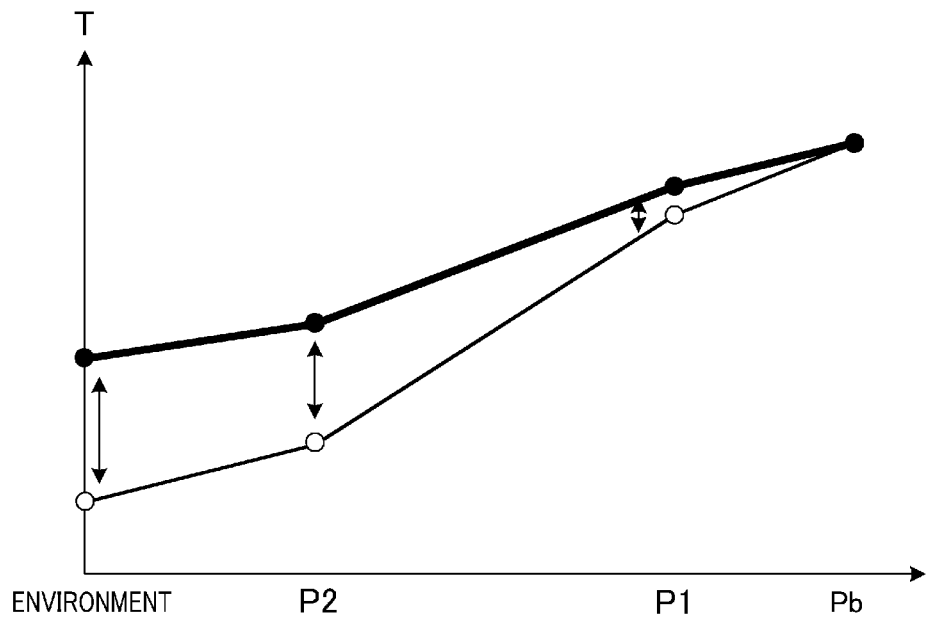
FIG. 2B is a figure to explain the quantity of change in temperature with respect to the change of environmental temperature.

FIGS. 2A, 2B are figures to explain the method for estimating the deep-body temperature.

As shown in FIG. 2A, the temperature estimation apparatus 1 uses a thermal model expressed by a thermal circuit that includes thermal resistances and that does not take capacitance components into account (quasi-static). On the basis of the thermal model, the heat flow between the heat source in the body (part Pb where the deep-body temperature is measured), the first part P1, the second part P2, and the external environment is considered. The heat flow is in a direction vertical to the body surface. Herein, the first part P1 is the eardrum Ed that is separate from the insertion section 10a inserted in the ear E. The distance between the first part P1 and the second part P2 is longer than the length of the insertion section 10a.

The heat flow I(t) between parts at a time (t) is determined by the thermal resistance R and the temperature difference dT(t) between the parts at the time (t). The thermal resistance between the measurement part Pb (deep-body temperature: Tb(t)) and the first part P1 (a surface including the first part P1) (temperature: $T1(t)$) is defined as the thermal resistance Rb (first thermal resistance). In this section, the relation among the outward heat flow Ib(t), the temperature $T1(t)$, the deep-body temperature Tb(t), and the thermal resistance Rb at the time (t) is expressed by the following Expression (1).

$$Ib(t)=(Tb(t)-T1(t))/Rb \quad (1)$$

Further, the thermal resistance between the first part P1 (a surface including the first part P1) and the second part P2 (a surface including the second part P2) (temperature: $T2(t)$) is defined as the thermal resistance Rs (second thermal resistance). In this section, the relation among the outward heat flow Is(t), the temperature $T1(t)$, the temperature $T2(t)$, and the thermal resistance Rs at the time (t) is expressed by the following Expression (2).

$$Is(t)=(T1(t)-T2(t))/Rs \quad (2)$$

In the thermal model, the heat of the heat source flows to a heat absorber (herein, the outside air) without increase or decrease. Therefore, Ib(t)=Is(t) holds. Accordingly, the deep-body temperature Tb(t) can be determined by measuring the temperature $T1(t)$ and the temperature $T2(t)$ and using the thermal resistances Rs, Rb as parameters. However, the thermal resistances Rs, Rb are unknown parameters for the temperature estimation apparatus 1 in this embodiment.

The Expressions (1), (2) are arranged into the following Expression (3).

$$Tb(t)=(Rb/Rs)\times(T1(t)-T2(t))+T1(t) \quad (3)$$

Herein, Rb/Rs is defined as a thermal resistance ratio a that represents the relation between the thermal resistance Rs and Rb. By obtaining the thermal resistance ratio a as a single parameter of thermal resistance, the deep-body temperature Tb(t) can be calculated on the basis of the thermal resistance ratio a and the measure temperatures $T1(t)$, $T2(t)$, without specifying the thermal resistances Rs, Rb.

In the Expression (3), it is not easy to measure/obtain deep-body temperature Tb(t) as the estimation target. Further, the thermal resistances Rb, Rs may not be determined beforehand to specific values because they are parameters that may vary depending on the measurement target subject and the state of the temperature estimation apparatus 1 attached to the subject. Herein, the time change of the Expression (3) is expressed by the following Expressions (4), (5).

$$dTb(t)=a\times dTdf(t)+dT1(t) \quad (4)$$

$$dTdf(t)=dT1(t)-dT2(t) \quad (5)$$

In the Expressions (4), (5), the thermal resistance ratio a is found by obtaining dTdf(t) (change quantity of difference between $dT1(t)$ and $dT2(t)$) that meets certain conditions regarding the temperature change quantity dTb(t) of the deep-body temperature Tb(t). That is, the thermal resistance ratio a is found by obtaining the temperature change quantity $dT1(t)$ of $T1(t)$ (first change quantity) and the temperature change quantity $dT2(t)$ of $T2(t)$ (second change quantity) that meet the certain conditions.

The temperature change quantity dTb(t) of the deep-body temperature Tb(t) may often become zero (a certain state of temperature change of the heat source). In particular, at bedtime, the deep-body temperature Tb(t) mainly changes gradually within the daily variation cycle and does not change greatly. The temperature change quantity dTb(t) therefore often becomes zero for a short period of time. Even in the case, the heat flow I(t) occurs between the deep-body temperature Tb(t) and the environmental temperature Te(t) because they are normally different. Accordingly, the temperature $T1(t)$ and the temperature $T2(t)$ change according to the change of the environmental temperature Te(t). At bedtime, the environmental temperature Te(t) may change by the effect of the positional relation between the ear and the mattress/quilt/pillow as well as by the effect of the ambient temperature (room temperature).

On assumption that the environmental temperature Te(t) changes, when the temperature change quantity dTb(t) of the deep-body temperature Tb(t) is zero in the thermal model of this embodiment, the change quantity $dT1(t)$ of the temperature $T1(t)$) and the change quantity $dT2(t)$ of the temperature $T2(t)$ may have some restrictions, as shown in FIG. 2B. Specifically, when the environmental temperature Te (t) changes with respect to the deep-body temperature Tb(t), the following conditions are satisfied:

Condition A: the temperature $T1(t)$ and the temperature $T2(t)$, which are measured between the heat source and the external environment, also change (the absolute value of the change quantity $dT1(t)$ and the absolute value of the change quantity $dT2(t)$ are equal to or greater than a certain first threshold).

Condition B: the temperatures $T1(t)$, $T2(t)$ change in the same direction as the change of the environmental temperature Te(t). That is, the change quantity $dT1(t)$ and the change quantity $dT2(t)$ have the same sign. The change quantities $dT1(t)$, $dT2(t)$ are determined by the thermal resistance ratios in the respective sections. The absolute value of the change quantity $dT2(t)$ of the temperature $T2(t)$ is greater than the absolute value of the change quantity $dT1(t)$ of the temperature $T1(t)$ (second condition). This is because the temperature $T2(t)$, which is measured near the outside, is more susceptible to the change in the environmental temperature Te(t) than the temperature $T1(t)$, which is measured inside.

When the condition B is satisfied and the change quantity $dT1(t)$ is greater than the first threshold, the change quantity $dT2(t)$ is inevitably greater than the first threshold. Therefore, in judging whether the condition A is satisfied, the change amount $dT2(t)$ may not be considered (the absolute value of the change quantity $dT1(t)$ is equal to or greater than the first threshold: first condition).

These conditions A, B (conditions corresponding to the certain state of change in temperature) are not sufficient conditions for the temperature change quantity dTb(t) being zero. On the other hand, the conditions A, B are necessary conditions in order that (i) the temperature change quantity dTb(t) is smaller than the change in the environmental temperature Te(t) and (ii) the supposition of the thermal model holds (i.e, there is no heat capacitance or another heat source between the measurement part Pb and the external environment) on assumption that the environmental temperature Te(t) changes. These conditions A, B are determined beforehand. The CPU 13 determines whether each pair of temperature change quantities $dT1(t)$, $dT2(t)$ meets the conditions A, B (i.e., the conditions A, B hold) and extracts pairs of temperature change quantities $dT1(t)$ and $dT2(t)$ that meet the conditions A, B. On the basis of the extracted temperature change quantities $dT1(t)$, $dT2(t)$, the CPU 13 statistically obtains a probable parameter (thermal resistance ratio a) for "dTb(t)=0". Thus, the deep-body temperature Tb(t) can be calculated/estimated.

The first threshold in the condition may be appropriately determined within the range of allowing the temperature change quantities $dT1(t)$, $dT2(t)$ to be measured.

Specifically, the matrices of components of extracted N pairs of temperature change data (change quantities $dT1(t)$, $dT2(t)$) are expressed as N-dimensional vectors: $v(dT1(ts))$, $v(dT2(ts))$. Further, the matrix of the change quantities dTb(t) of the deep-body temperature Tb(t) is expressed as an N-dimensional vector: v(dTb(ts)). Herein, "v" represents a vector. On the basis of the Expression (4), the relation of these vectors are expressed by the following Expression (6).

$$v(dTb(ts)) = a \times v(dTdf(ts)) + v(dT1(ts)) \qquad (6)$$

The probable thermal resistance ratio a is the thermal resistance ratio a when |v(dTb(ts))| (magnitude of v(dTb(ts))) is minimum. That is, the probable thermal resistance ratio a is the thermal resistance ratio a when the partial derivative of the sum of squares of the right side of the Expression (6) with respect to "a" is zero. The result of the arithmetic calculation is expressed by the following Expression (7).

$$a = -v(T1(ts)) \cdot v(dTdf(ts)) / |v(dTdf(ts))|^2 \qquad (7)$$

In the Expression (7), "·" indicates the inner product of vectors on both sides.

Each of the extracted change quantities dT1($ts$), dT2($ts$) may simply be a difference of measurement results that are adjacent in temporal order. On the other hand, the time changes of the temperatures T1($t$), T2 ($t$) may be smoothed because they generally include small variations and fluctuations caused by noise or measurement accuracy (resolution of digitized values). To smooth the time changes, a difference between moving averages (or weighted means) of measurement results within a predetermined period with respect to a specific time may be obtained. As another example, multiple pieces of measured data within a predetermined period may be filtered with frequency to remove frequency components that can be noise in the measurement;
the time changes may be smoothed; and a difference between the smoothed pieces of time data may be obtained. For another example, polynomial approximation may be applied to a local change within a specific period. On the basis of the output by the differential filter of Savitzky-Golay that uses the polynomial approximation, the change quantities dT1($t$), dT2($t$) may be obtained. Immediately after the environmental temperature Te(t) changes, the temperature distribution and heat flow may be in a dynamic state and discrepant from the thermal model. It is therefore preferable that the smoothing be performed with frequency characteristics so as to reflect temperature changes in a time span in which the dynamic state settles.

As described above, the temperature estimation apparatus 1 in this embodiment obtains multiple pieces of measured data and thereafter obtains the thermal resistance ratio a as the parameter. Statistically, accuracy increases when a more number of pairs of measured data are extracted within the range of not changing the thermal resistance ratio a. Therefore, the temperature estimation apparatus 1 does not estimate the deep-body temperature Tb(t) in real time. Instead, the temperature estimation apparatus 1 estimates the deep-body temperature Tb(t) using the thermal resistance ratio a after obtaining a certain amount of measurement data for a certain period of measurement time. For example, the temperature estimation apparatus 1 may continuously obtain measured data during hours of sleep; after completing the measurement according to measured data by another sensor or according to time information, the apparatus 1 may altogether obtain the thermal resistance ratio a and estimate the deep-body temperatures Tb(t) of the respective times.

Figure 3:
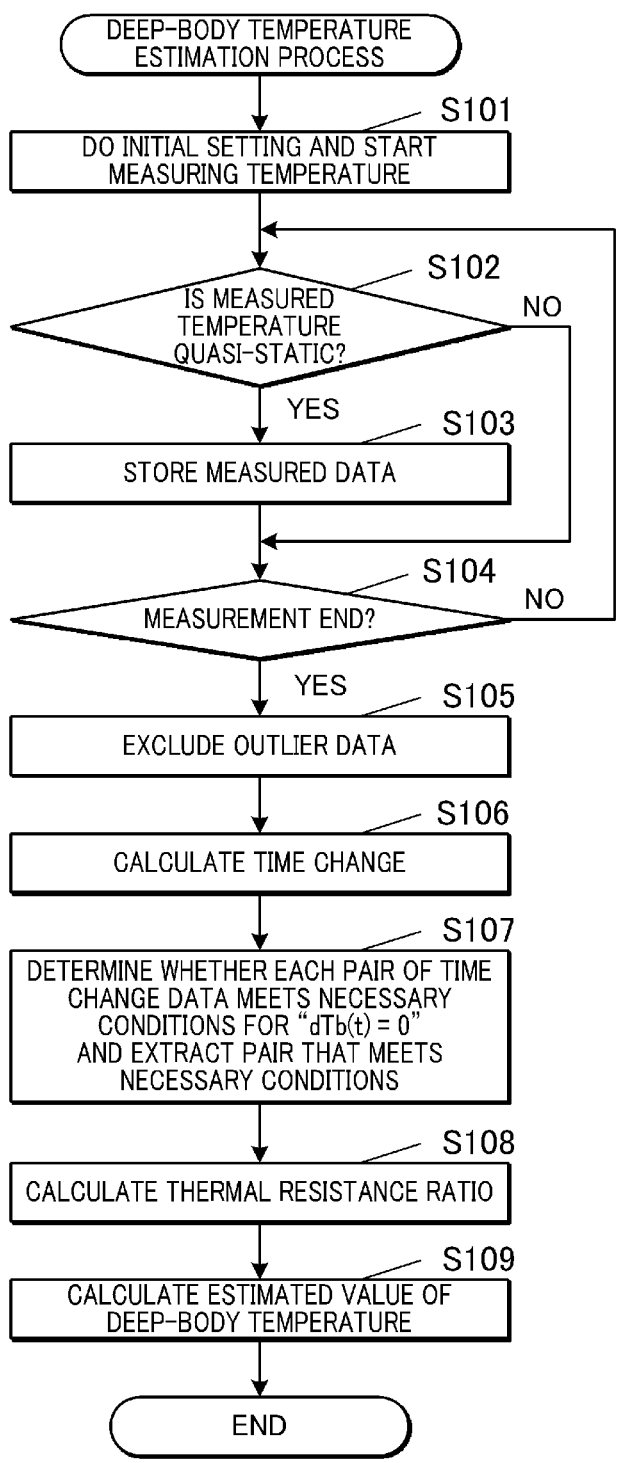
FIG. 3 is a flowchart of a control procedure of a deep-body temperature estimation process.

FIG. 3 is a flowchart of the deep-body temperature estimation process to be executed by the temperature estimation apparatus 1 in this embodiment. The process is controlled by the CPU 13.

The temperature estimation apparatus 1 may continually measure temperatures after starting operation until a predetermined time elapses. In the case, the CPU 13 starts the deep-body temperature estimation process by reading the program 141 from the nonvolatile memory at the time of starting the operation, for example.

When the deep-body temperature estimation process starts, the CPU 13 does initial setting, such as activating the first and second measurers 11, 12 and setting a storage area, and starts measuring temperatures with the first measurer 11 and the second measurer 12 (Step S101). The first measurer 11 and the second measurer 12 may measure temperatures at the same timing or at slightly different timings. The difference of timings should be shorter than the timescale of heat conduction between the first part P1 and the second part P2. The first and second measurers 11, 12 may measure temperatures at the same timing and send the measured data to the CPU 13 at different timings.

The CPU 13 determines whether the measured temperature is quasi-static (Step S102). Herein, a non quasi-static state may be a state where the temperature T2($t$) rapidly changes by heat flow generated by a large temperature difference between the second part P2 and the temperature estimation apparatus 1 when the apparatus 1 is attached to the ear, for example. After starting the measuring, the CPU 13 may determine that the measured temperature is not quasi-static until the temperature rapidly increases to around a supposed body temperature (36-40° C.) and reaches a maximum value or until the temperature change is equal to or less than a threshold. After the measuring starts, temperatures may rapidly change during the measuring, and the heat flow (temperature distribution) may be dynamic. Such rapidly changing temperatures may be determined to be quasi-static or not in the deep-body temperature estimation process. Alternatively, such rapidly changing temperatures may be altogether obtained in the process without being determined to be quasi-static or not and may be processed in the later analysis.

When determining that the measured temperature is quasi-static (Step S102: YES), the CPU 13 obtains measured data from the first measurer 11 and the second measurer 12 and stores the data in the storage 14 (Step S103). The measured data is stored such that the date and time of measurement can be identified. For example, the storage 14 may store the measured temperature in association with the corresponding date and time of measurement. For another example, the storage 14 may store only the storage-start date and time and the measurement interval as initial information and thereafter store only measured temperatures in order. In the case, when a measurement error occurs after the CPU 13 starts obtaining quasi-static data, the CPU 13 does not skip the measured data but stores data that indicates an error. The CPU 13 may send the measured data stored in the storage 14 to an external device through the communication unit 15. The CPU 13 then proceeds to Step S104. When determining that the measured temperature is not quasi-static (Step S102: NO), the CPU 13 proceeds to Step S104.

After proceeding to Step S104, the CPU 13 determines whether the measuring has ended (Step S104). The measuring may end when the measurement time (measurement time zone) ends; when the switch is manually turned off; and when the temperature estimation apparatus 1 is detached from the ear, for example. When determining that the measuring has not ended yet (Step S104: NO), the CPU 13 returns to Step S102.

When determining that the measuring has ended (Step S104: YES), the CPU 13 removes data of outliers from the matrix of measured and stored temperatures (step S105). For example, the CPU 13 may detect a measured temperature as an outlier the deviation of which is greater than a reference deviation on the basis of the standard deviation of measured temperatures within a certain period of time. For another example, the CPU 13 may detect a measured temperature as an outlier the deviation of which is greater than a standard value on the basis of the mean absolute deviation (e.g., the Hampel identifier). The above-mentioned error data may be included as outliers. The measured value of a detected outlier may be replaced with an interpolation value of adjacent data (more than one value before/after the outlier may be used) or a median of neighboring values.

On the basis of the matrix of the measured data, the CPU 13 calculates $dT1(t)$ (change quantity in the temperature $T1(t)$) and $dT2(t)$ (change quantity in the temperature $T2(t)$) (Step S106). For each of the obtained pairs of time-change data, the CPU 13 determines whether the pair meets the above-described conditions A and B and extracts pairs of time-change quantities $dT1(ts)$, $dT2(ts)$ (altogether referred to as temperature-for-estimation data) that meet the conditions A and B (Step S107, obtaining unit, obtaining step). On the basis of the extracted data and the Expression (6), the CPU 13 calculates and obtains the thermal resistance ratio a (Step S108: parameter obtaining unit, parameter obtaining step).

On the basis of the obtained thermal resistance ratio a and the Expression (3), the CPU 13 calculates the estimated value of the deep-body temperature $Tb(t)$ at the timing when each pair of temperatures $T1(t)$, $t2(t)$ is measured (Step S109: temperature estimating unit, temperature estimating step). The CPU 13 then ends the deep-body temperature estimation process.

Before ending the process, the CPU 13 may send/output the history data of pairs of temperatures $T1(t)$, $T2(t)$ and the deep-body temperature $Tb(t)$ to an external device via the communication unit 15. Alternatively, the CPU 13 may send/output the history data only when receiving an instruction by a manual operation, for example.

As described above, the thermal resistance ratio a as a single parameter is statistically obtained on the basis of the history data of measured and obtained temperatures $T1(t)$, $T2(t)$. On the basis of the thermal resistance ratio a, the deep-body temperature $Tb(t)$ that corresponds to each pair of temperatures $T1(t)$, $T2(t)$ is obtained.

Modification

The deep-body temperature estimation process in this embodiment may be modified as a first modification. In the first modification, when the temperature estimation apparatus 1 obtains measured data for a certain reference time or longer in the middle of measurement time, the apparatus 1 may obtain the thermal resistance ratio a and estimate deep-body temperatures $Tb(t)$ at respective times the temperatures $T1(t)$, $T2(t)$ are obtained. Thereafter, the temperature estimation apparatus 1 may obtain temperatures $T1(t)$, $T2(t)$ and estimate deep-body temperatures $Tb(t)$ in real time.

Figure 4:
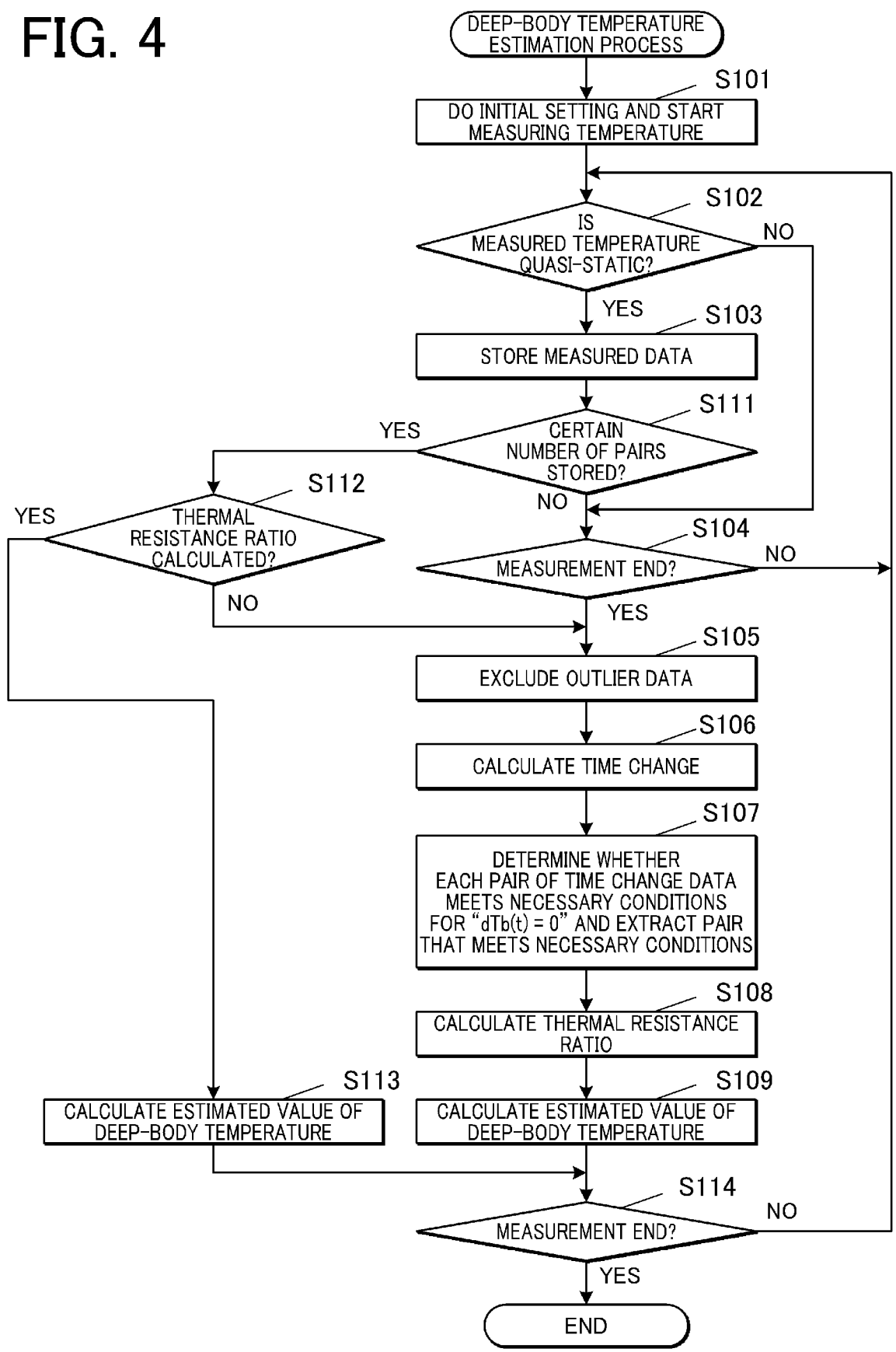
FIG. 4 is a flowchart of a first modification of the deep-body temperature estimation process.

FIG. 4 is a flowchart of a first modification of the deep-body temperature estimation process;

In the deep-body temperature estimation process in the first modification, deep-body temperatures are estimated in real time to the extent possible. The deep-body temperature estimation process in the first modification may be preferably used in a case where the measurement results are output to and displayed on an external device in real time.

The deep-body temperature estimation process in the first modification includes Steps S111 to S114 in addition to the deep-body temperature estimation process of the embodiment in FIG. 3. The other steps in the first modification are the same as those in FIG. 3. The same steps are indicated by the same reference numerals, and the detailed description thereof is omitted.

After storing the measured data in the storage 14 in Step S103, the CPU 13 determines whether a certain number of pairs of measured data are stored in the storage 14 (step S111). When determining that a certain number of pairs of measured data are not stored in the storage 14 (Step S111: NO), the CPU 13 proceeds to Step S104.

When determining that a certain number of pairs of measured data are stored in the storage 14 (Step S111: YES), the CPU 13 determines whether the thermal resistance ratio a has been calculated (Step S112). When determining that the thermal resistance ratio a has not been calculated (Step S112: NO), the CPU 13 proceeds to Step S105. When determining that the thermal resistance ratio a has been calculated (Step S112: YES), the CPU 13 calculates the estimated value of the deep-body temperature Tb(t) on the basis of the thermal resistance ratio a and the measured data stored in the most recent Step S103 (Step S113). The CPU 13 may send the estimated value of the deep-body temperature Tb(t) to an external device via the communication unit 15, as described above. The CPU 13 then proceeds to Step S114.

The CPU 13 also proceeds to Step S114 after Steps S105 to S109.

After proceeding to Step S114, the CPU 13 again determines whether the measuring has ended (measurement time period/measurement time zone has ended) (Step S114). When determining that the measuring has not ended yet (Step S114: NO), the CPU 13 returns to Step S102. When determining that the measuring has ended (Step S114: YES), the CPU 13 ends the deep-body temperature estimation process.

The deep-body temperature estimation process in this embodiment may be modified as a second modification. In the second modification, the temperature estimation apparatus 1 does not calculate the probable thermal resistance ratio a on the basis of all the extracted temperature change quantities $dT1(ts)$, $dT2(ts)$. Instead, the apparatus 1 calculates the thermal resistance ratio $a(t)$ for each pair of $dT1(t)$ and $dT2(t)$ and determines the representative value of the calculated thermal resistance ratios $a(t)$, which are as many as the extracted pairs of $dT1(t)$ and $dT2(t)$, to be the thermal resistance ratio a.

In the case, the mean value or the median of the thermal resistance ratios a may be determined as the representative value of the thermal resistance ratios a, for example.

The deep-body temperature estimation process in this embodiment may be modified as a third modification. In the third modification, the temperature estimation apparatus 1 performs the statistical calculation of the embodiment using the individually calculated thermal resistance ratios a of the second modification. For example, the CPU 13 may calculate thermal resistance ratios $a(t)$ for individual pairs of temperature change quantities $dT1(t)$, $dT2(t)$ that meet the conditions A, B (multiple pieces of temperature-for-estimation data regarding respective pairs); the CPU 13 may exclude pairs of temperature change quantities $dT1(t)$, $dT2(t)$ that yielded outliers $a(t)$; the CPU 13 may then obtain the statistically probable thermal resistance ratio a on the basis of the vectors of temperature change quantities $v(dT1(tsm))$, $v(dT2(tsm))$ from which pairs corresponding to outliers have been excluded. Outliers may be identified by using the standard deviation or the Hampel identifier, for example.

Figure 5:
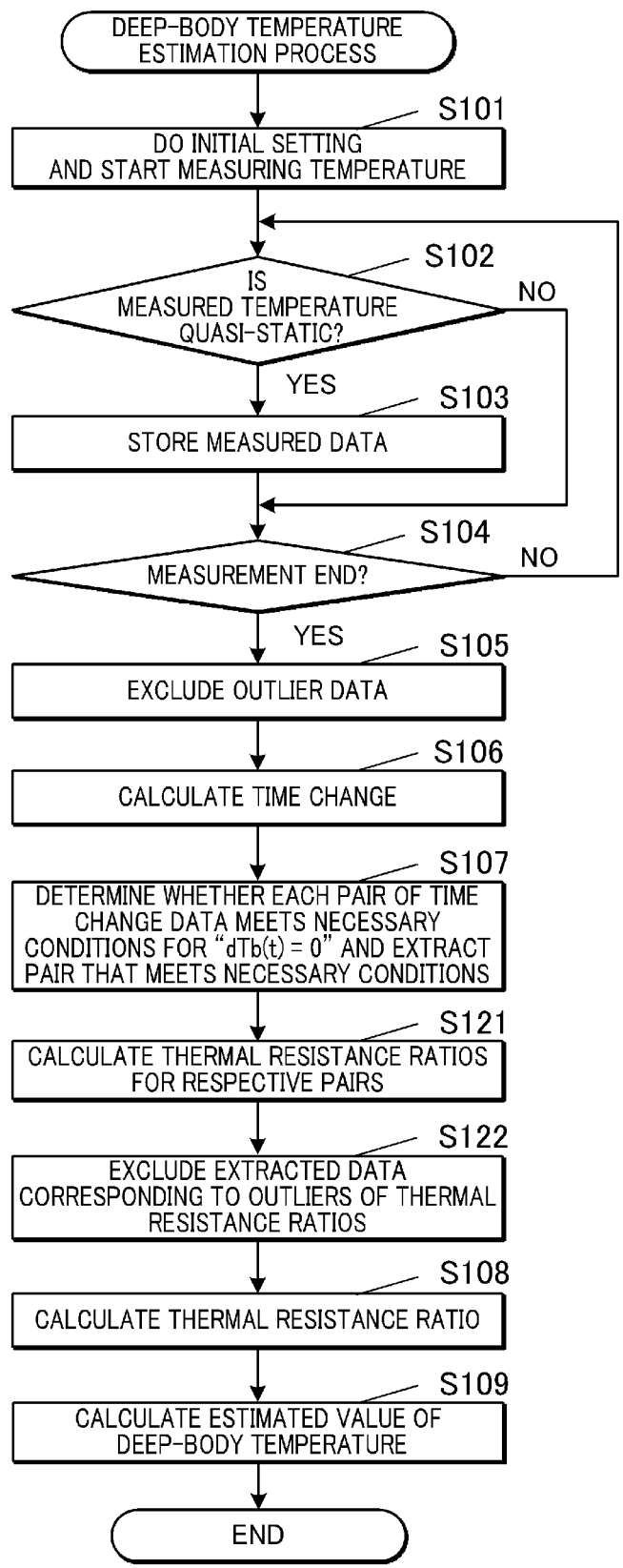
FIG. 5 is a flowchart of a third modification of the deep-body temperature estimation process.

FIG. 5 is a flowchart of the control procedure of the third modification of the deep-body temperature estimation process.

The third modification of the deep-body temperature estimation process is different from the above embodiment (FIG. 3) in that Steps S121, S122 are added. The other steps in the third modification are the same as those of the above embodiment. The same steps are denoted by the same reference numerals and not described.

In Step S107, the CPU 13 extracts data that meet the conditions A,B regarding changes in the deep-body temperature (Step S107). The CPU 13 then calculates the thermal resistance ratio a(t) for each pair of temperatures dT1(t), dT2(t) on the basis that "dTb(t)=0" holds (Step S121). The CPU 13 identifies outliers from among the obtained thermal resistance ratios a(t) and excludes pairs of temperatures dT1(t), dT2(t) that yielded the identified outliers from the data extracted in Step S107 (Step S122). The CPU 13 then proceeds to Step S108.

Figure 6A:
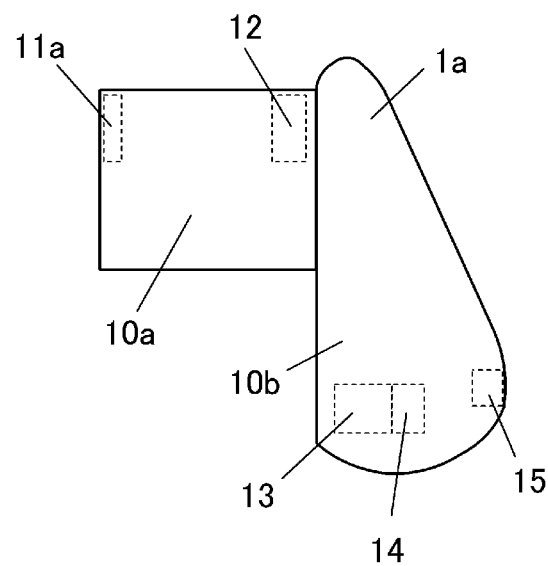
FIG. 6A is a fourth modification of the temperature estimation apparatus.
Figure 6B:
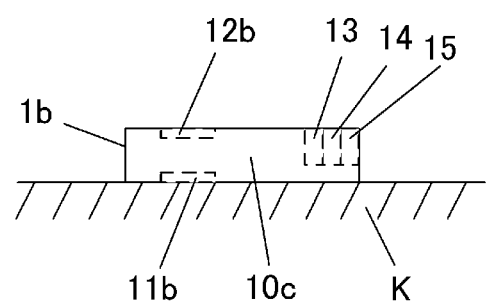
FIG. 6B is a fifth modification of the temperature estimation apparatus.

FIGS. 6A, 6B show modifications of the temperature estimation apparatus 1.

As shown in FIG. 6A, in the fourth modification, the first measurer 11a of the temperature estimation apparatus 1a may be a contact type thermometer like the second measurer 12. The first measurer 11a is configured to be in contact with the wall of the ear to measure temperatures. When the measurement position of the first measurer 11a is too close to the measurement position of the second measurer 12 with respect to the depth direction from the ear hole, accuracy of measurement decreases. To avoid this, the insertion section 10a is configured to have an appropriate length. The insertion section 10a may have such a shape and thickness that allows the first measurer 11a near the leading end to smoothly abut the wall of the ear.

The temperature estimation apparatus 1 may not be inserted into the ear to measure temperatures in the ear, as shown by the temperature estimation apparatus 1b in the fifth modification shown in FIG. 6B. In the fifth modification, the first measurer 11b, the second measurer 12b, the CPU 13, the storage 14, and the communication unit 15 are disposed in or on the surface of a thin structure 10c that is configured to be attached to the body surface K (e.g., the forehead). The first part where the first measurer 11b measures temperature is in contact with or near the body surface K (measurement part of the deep-body temperature). The second part where the second measurer 12b measures temperature is farther from the body surface K than the first part of the first measurer 11b.

Such a temperature estimation apparatus 1b can estimate the deep-body temperature by simply calculating the thermal resistance ratio a, which is the ratio of the thermal resistance Rb (thermal resistance in the body) to the thermal resistance Rs (thermal resistance of the structure 10c). The temperature estimation apparatus 1b does not need to determine the thermal resistance Rs of the structure 10c, which may vary depending on the external environment, body temperature, and sweat.

According to the known art, the thermal resistance between two points is a known parameter. However, the parameter for estimating the temperature of the estimation target part may vary depending on the state of the temperature estimation apparatus attached to the estimation target and the state of the estimation target. It is therefore difficult to steadily obtain the temperature of the estimation target part.

To deal with the above issue, as described above, according to this embodiment, the temperature estimation apparatus 1 includes the first measurer 11 configured to measure the temperature T1(t) of the first part P1 of a target (living body) that has a heat source; the second measurer 12 configured to measure the temperature T2(t) of the second part P2 that is farther from the heat source than the first part P1; and the CPU 13. The CPU 13 obtains the temperature change quantities dT1(t) and dT2(t) that meet predetermined certain conditions A, B corresponding to a certain state of change in a temperature of the heat source (herein, dTb(t)=0) (Step S107). Herein, "certain conditions" are not limited to a single condition. Based on the obtained dT1(t), dT2(t), the CPU 13 obtains (Step S108) a thermal resistance parameter (thermal resistance ratio a) that represents the relation (ratio) between the thermal resistance Rb and the thermal resistance Rs in a thermal model, wherein the thermal model includes the heat source, the first part P1, and the second part P2; in the thermal model, the thermal resistance Rb represents the relation of temperatures (Tb(t), T1(t)) and heat flow Ib(t) between the heat source and the first part P1; and the thermal resistance Rs represents the relation of temperatures T1(t), T2(t) and heat flow Is(t) between the first part P1 and the second part P2 (the thermal model does not include thermal capacitance components). Based on the obtained thermal resistance parameter and the temperatures T1(t) and T2(t), the CPU 13 estimates the temperature of the heat source as the deep-body temperature Tb(t) of the target (living body) (Step S109).

According to such a configuration, the temperature estimation apparatus 1 does not determine either the thermal resistance Rs or the thermal resistance Rb. Instead, the temperature estimation apparatus 1 estimates the thermal resistance ratio a (single parameter) on the basis of measured data that meet certain conditions. The temperature estimation apparatus 1 thus can estimate the deep-body temperature Tb(t) using temperatures measured at two positions. Accordingly, the temperature estimation apparatus 1 easily obtains the deep-body temperature Tb(t) without increasing the number of positions where temperatures are measured. The temperature estimation apparatus 1 may obtain and update the thermal resistance ratio a every measurement period so as to easily deal with changes in the measurement state of the thermal resistances Rs, Rb. The temperature estimation apparatus 1 thus can obtain a more accurate thermal resistance ratio a that reflects the change in the measurement state.

Further, the certain conditions may include: the condition A that the absolute value of the change quantity dT1(t) of the measured temperature T1(t) be equal to or greater than a threshold; and the condition B that the change quantity dT1(t) and the change quantity dT2(t) of the measured temperature T2(t) have an identical sign and that the absolute value of the change quantity dT2(t) be greater than the absolute value of the change quantity dT1(t). In this embodiment, the thermal model is a thermal circuit that includes thermal resistances only but does not take thermal capacitances into account. In such a thermal model, when the environmental temperature Te(t) changes while the change quantity dTb(t) of the deep-body temperature Tb(t) is zero, the change in the environmental temperature Te(t) affects both the first part P1 and the second part P2 in the same trend, wherein the change in the environmental temperature Te(t) affects more strongly the temperature T2(t) of the second part P2, which is closer to the external environment. The temperature estimation apparatus 1 uses measured data that meet temperature conditions that occur when (i) "temperature change quantity dTb(t)=0" holds and (ii) the environmental temperature Te(t) changes in order to obtain the unknown parameter (thermal resistance ratio a). Accordingly, the temperature estimation apparatus 1 can obtain the thermal resistance ratio a at a certain level of accuracy when the deep-body temperature Tb(t) is not directly measured.

Further, the certain state of change in the temperature of the heat source may be a state where the temperature of the heat source does not change over time (dTb(t)=0). The above conditions A, B are determined as necessary conditions for "dTb(t)=0", and measured data is extracted on the basis of the conditions A, B. This allows the thermal resistance ratio a to be the only unknown parameter that can be easily calculated.

Further, the CPU 13 may obtain multiple pieces of temperature-for-estimation data (multiple pairs of temperature change quantities dT1(t), dT2(t)) regarding temperatures T1(t), T2(t). Based on the temperature-for-estimation data, the CPU 13 may obtain the thermal resistance ratio a that is probable (Step S108). As described above, the conditions for extracting pairs of T1(t), T2(t) are not sufficient conditions for "dTb(t)=0". Therefore, the extracted data may include data that yields the temperature change quantity dTb(t) that slightly deviates from zero. Such imperfect pairs of data are altogether statically processed to improve the accuracy of the probable thermal resistance ratio a, so that the deep-body temperature Tb(t) can be accurately estimated.

Alternatively, the CPU 13 may obtain the thermal resistance ratios a(t) for the respective pieces of temperature-for-estimation data (i.e., respective pairs of temperature change quantities dT1(t), dT2(t) that meet the conditions A, B) (Step S121). The CPU 13 may exclude a pair(s) of change quantities dT1(t), dT2(t) that yields a thermal resistance ratio a(t) that is determined as an outlier not meeting a predetermined criterion among the obtained multiple thermal resistance ratios a(t) (Step S122). Based on the multiple pieces of temperature-for-estimation data from which the pair of dT1(t), dT2(t) that yields an outlier thermal resistance ratio a(t) is excluded, the CPU 13 may obtain the thermal resistance ratio a that is probable (Step S108).

According to the above, the thermal resistance ratio a is statistically obtained after excluding a pair(s) of dT1(t), dT2 (t) that meets the conditions A, B but that yields a thermal resistance ratio a greatly deviating from thermal resistance ratios a of the other pairs of dT1(t), dT2(t). This can yield a more accurate thermal resistance ratio a. Accordingly, the temperature estimation apparatus 1b can estimate the deep-body temperature Tb(t) more accurately.

Further, the thermal resistance parameter is the thermal resistance ratio a that is the ratio of the thermal resistance Rs to the thermal resistance Rb. As the Expression (3) shows, the thermal resistance ratio a is an optimum parameter that represents the relation between the thermal resistance Rb and the thermal resistance Rs. By obtaining the thermal resistance ratio a with the Expression (7), the deep-body temperature Tb(t) can be easily estimated and obtained.

The temperature estimation method according to the present invention uses the first measurer 11 configured to measure the temperature T1(t) of the first part P1 of the target (living body) that has the heat source; and the second measurer 12 configured to measure the temperature T2(t) of the second part P2 that is farther from the heat source than the first part P1. The method includes: obtaining (Step S107) the temperature T1(t) and the temperature T2(t) that are obtained in a state where predetermined certain conditions A, B are satisfied, the certain conditions A, B corresponding to a certain state of change in a temperature of the heat source (herein, dTb(t)=0); obtaining (Step S108) a thermal resistance parameter (thermal resistance ratio a) that represents the relation between the thermal resistance Rb and the thermal resistance Rs in a thermal model based on the obtained temperatures T1(t), T2(t), wherein the thermal model includes the heat source, the first part P1, and the second part P2; in the thermal model, the thermal resistance Rb represents the relation of temperatures (Tb(t), T1(t)) and heat flow Ib(t) between the heat source and the first part P1; and the thermal resistance Rs represents the relation of temperatures T1(t), T2(t) and heat flow Is(t) between the first part P1 and the second part P2 (the thermal model does not include thermal capacitance components); and estimating (Step S109) the temperature of the heat source as the deep-body temperature Tb(t) of the target (living body) based on the obtained thermal resistance parameter and the temperatures T1(t) and T2(t).

According to the temperature estimation method in this embodiment, neither the thermal resistance Rs or Rb is determined. In the method, temperatures are measured only at two points, and on the basis of the measured temperatures, a parameter representing the relation between the thermal resistances Rs and Rb is obtained for every measurement period. Accordingly, the deep-body temperature Tb(t) can be estimated. Thus, according to this temperature estimation method, the deep-body temperature Tb(t), which cannot be directly measured, can be stably obtained.

Further, the program 141 in this embodiment may be installed in a computer configured to receive (obtain) data from the first measurer 11 and the second measurer 12, and the program may cause the computer to perform the above-described process of the temperature estimation method. Thus, the computer can easily and stably estimate the deep-body temperature Tb(t) on the basis of temperatures measured at two points without a special hardware.

The above embodiment does not limit the present invention and can be variously modified.

For example, in the above embodiment, the conditions A, B are presented as an example of necessary conditions for the temperature change quantity dTb(t) of the deep-body temperature Tb(t) being zero. In addition to or instead of these conditions, other necessary conditions may be used. The conditions may be determined such that the temperature change quantity dTb(t) is more certainly close to zero within the range of being able to extract sufficient pairs of measured data for obtaining the thermal resistance ratio a during the continuous temperature measurement. Further, the conditions may not only be necessary conditions but may be necessary and sufficient conditions. Further, there may be a case where a biometric measurement apparatus other than the temperature estimation apparatus 1 obtains the measurement result (e.g., measures pulse (heartbeat)). In the case, a condition that is individual from the above-described conditions A, B may be added for "dTb(t)=0". For example, a condition that the pulse is less than a predetermined reference value (e.g, during non-rapid eye movement (non-REM) sleep) may be added.

When the temperature change quantity dTb(t) is certainly close to zero, the number of pairs of measured data used for obtaining the thermal resistance ratio a may be reduced (minimum: one pair).

In the above embodiment, the necessary conditions for "dTb(t)=0" are determined. However, necessary conditions for the other state may be used. Such necessary conditions are theoretically also applicable to the above-described method to obtain the thermal resistance ratio a and estimate the deep-body temperature Tb(t).

In the above embodiment, multiple pieces of measured data are obtained in succession; the obtained multiple pieces of measured data are altogether judged whether they meet the conditions A, B; and the thermal resistance ratio a is obtained on the basis of the data that meet the conditions A, B. The present invention, however, is not limited to this. It may be determined whether measured data meets the conditions A, B and a flag may be set every time measured data is obtained. When the necessary amount of data is obtained, the data to be used for obtaining the thermal resistance ratio a may be extracted on the basis of the flag.

In the above description, the thermal resistance ratio a is the single parameter to be obtained. However, the parameter is not limited to the thermal resistance ratio a as long as the parameter specifies the relation between the thermal resistance Rs and Rb.

In the above embodiment, the temperature estimation apparatus 1 obtains the thermal resistance ratio a and estimates the deep-body temperature Tb(t). However, the present invention is not limited to this. The measured data of temperatures T1(t), T2(t) may be transferred to an external device, and the external device may obtain the thermal resistance ratio a and estimate the deep-body temperature Tb(t). In the case, the deep-body temperature Tb(t) may be shown on the external device or may be sent back to the temperature estimation apparatus 1 via the communication unit 15 and shown on the temperature estimation apparatus 1.

Further, in the above description, the storage 14 consisting of a nonvolatile memory (e.g., flash memory) or the like is described as an example of a computer-readable storage medium storing the program 141 for executing the deep-body temperature estimation process of the present invention. However, the computer readable medium is not limited to this. As other computer readable media, other types of nonvolatile memory (e.g., magneto-resistive random access memory (MRAM)) and portable recording media (e.g., hard disk drive (HDD), CD-ROM, DVD) may be used. Further, a carrier wave may be used as a medium to provide data of the programs of the present invention via a communication line.

The detailed configurations, contents and orders of processing operations, and so forth shown in the above embodiment can be appropriately modified without departing from the scope of the present invention.

Although some embodiments have been described, the scope of the present invention is not limited to the embodiment described above but encompasses the scope of the invention recited in the claims and the equivalent thereof.

What is claimed is:

1. A temperature estimation apparatus comprising:
a first temperature sensor configured to measure a first temperature of a first part of a target that has a heat source;
a second temperature sensor configured to measure a second temperature of a second part of the target, the second part being farther from the heat source than the first part; and
a processor that is configured to:
obtain temperature-for-estimation data regarding the first temperature and the second temperature that are measured by the first temperature sensor and the second temperature sensor, respectively in a state where a predetermined certain condition is satisfied, the predetermined certain condition corresponding to a certain state of change in a temperature of the heat source,
based on the obtained temperature-for-estimation data, obtain a thermal resistance parameter that represents a relation between a first thermal resistance and a second thermal resistance in a thermal model,
wherein the thermal model includes the heat source, the first part, and the second part, and
wherein, in the thermal model, the first thermal resistance represents a relation of temperatures and heat flow between the heat source and the first part, and the second thermal resistance represents a relation of temperatures and heat flow between the first part and the second part; and
based on the obtained thermal resistance parameter, the measured first temperature and the second temperature, estimate a temperature of the heat source as a deep-body temperature of the target.

2. The temperature estimation apparatus according to claim 1,
wherein the thermal resistance parameter is a ratio of the second thermal resistance to the first thermal resistance.

3. The temperature estimation apparatus according to claim 1,
wherein the predetermined certain condition includes:
a first condition that an absolute value of a first change quantity of the measured first temperature be equal to or greater than a threshold; and
a second condition that the first change quantity and a second change quantity of the measured second temperature have an identical sign and that an absolute value of the second change quantity be greater than the absolute value of the first change quantity.

4. The temperature estimation apparatus according to claim 3, wherein the certain state of change in the temperature of the heat source is a state where the temperature of the heat source does not change over time.

5. The temperature estimation apparatus according to claim 1,
wherein the processor is configured to:
obtain multiple pieces of the temperature-for-estimation data regarding the first temperature and the second temperature; and
based on the multiple pieces of the temperature-for-estimation data, obtain the thermal resistance parameter.

6. The temperature estimation apparatus according to claim 5,
wherein the processor is configured to:
obtain the thermal resistance parameter for each of the multiple pieces of the temperature-for-estimation data;
exclude a piece of the temperature-for-estimation data that yields a thermal resistance parameter not meeting a predetermined criterion from the multiple pieces of the temperature-for-estimation data; and
based on the multiple pieces of the temperature-for-estimation data from which the piece of the temperature-for-estimation data is excluded, obtain the thermal resistance parameter.

7. A temperature estimation method using a first temperature sensor configured to measure a first temperature of a first part of a target that has a heat source; and a second temperature sensor configured to measure a second temperature of a second part of the target, the second part being farther from the heat source than the first part, the temperature estimation method comprising:
obtaining temperature-for-estimation data regarding the first temperature and the second temperature that are measured by the first temperature sensor and the second temperature sensor, respectively in a state where a predetermined certain condition is satisfied, the predetermined certain condition corresponding to a certain state of change in a temperature of the heat source;

obtaining a thermal resistance parameter that represents a relation between a first thermal resistance and a second thermal resistance in a thermal model, based on the obtained temperature-for-estimation data, wherein the thermal model includes the heat source, the first part, and the second part, and wherein, in the thermal model, the first thermal resistance represents a relation of temperatures and heat flow between the heat source and the first part, and the second thermal resistance represents a relation of temperatures and heat flow between the first part and the second part; and estimating a temperature of the heat source as a deep-body temperature of the target, based on the obtained thermal resistance parameter, the measured first temperature, and the second temperature.

8. The temperature estimation method according to claim 7, wherein the thermal resistance parameter is a ratio of the second thermal resistance to the first thermal resistance.

9. The temperature estimation method according to claim 7, wherein the predetermined certain condition includes:

a first condition that an absolute value of a first change quantity of the measured first temperature be equal to or greater than a threshold; and a second condition that the first change quantity and a second change quantity of the measured second temperature have an identical sign and that an absolute value of the second change quantity be greater than the absolute value of the first change quantity.

10. The temperature estimation method according to claim 9, wherein the certain state of change in the temperature of the heat source is a state where the temperature of the heat source does not change over time.

11. The temperature estimation method according to claim 7, wherein multiple pieces of the temperature-for-estimation data regarding the first temperature and the second temperature are obtained; and wherein, based on the multiple pieces of the temperature-for-estimation data, the thermal resistance parameter is obtained.

12. The temperature estimation method according to claim 11, wherein the thermal resistance parameter is obtained for each of the multiple pieces of the temperature-for-estimation data, wherein a piece of the temperature-for-estimation data that yields a thermal resistance parameter not meeting a predetermined criterion is excluded from the multiple pieces of the temperature-for-estimation data, and wherein, based on the multiple pieces of the temperature-for-estimation data from which the piece of the temperature-for-estimation data is excluded, the thermal resistance parameter is obtained.

13. A non-transitory computer-readable storage medium storing a program for a computer that obtains measurement results from a first temperature sensor configured to measure a first temperature of a first part of a target that has a heat source and from a second temperature sensor configured to measure a second temperature of a second part of the target, the second part being farther from the heat source than the first part, the program causing the computer to:

obtain temperature-for-estimation data regarding the first temperature and the second temperature that are measured by the first temperature sensor and the second temperature sensor, respectively in a state where a predetermined certain condition is satisfied, the predetermined certain condition corresponding to a certain state of change in a temperature of the heat source;

obtain a thermal resistance parameter that represents a relation between a first thermal resistance and a second thermal resistance in a thermal model, based on the obtained temperature-for-estimation data, wherein the thermal model includes the heat source, the first part, and the second part, and wherein, in the thermal model, the first thermal resistance represents a relation of temperatures and heat flow between the heat source and the first part, and the second thermal resistance represents a relation of temperatures and heat flow between the first part and the second part; and estimate a temperature of the heat source as a deep-body temperature of the target, based on the obtained thermal resistance parameter, the measured first temperature and the second temperature.

* * * * *